3,380,945
PROCESS FOR THE PREPARATION OF POLYETHYLENE EMULSIONS
Oliver deS. Deex and James D. Gabbert, St. Louis, Mo., assignors to Monsanto Company, St. Louis, Mo., a corporation of Delaware
No Drawing. Filed July 13, 1965, Ser. No. 471,757
5 Claims. (Cl. 260—29.6)

The present invention relates to the emulsion polymerization of ethylene. More particularly, the present invention relates to a process for the preparation of stable, high solids content polyethylene emulsions containing relatively uniform, spherical particles.

It has been known for some time that aqueous polyethylene emulsions are particularly valuable vehicles for use in the preparation of continuous, coherent films and coatings. For such uses the emulsions must meet numerous requirements, specifications and considerations. For example, the emulsion must be film forming by evaporation of the water. It must be stable to applied stresses and to environmental exposure. These requirements and considerations, as well as many others, are well known to the skilled worker in the emulsion art.

In general two processes have been used in the preparation of aqueous polyethylene emulsions. Polyethylene made by non-dispersion polymerization techniques is subjected to comminutation and then dispersed in water with the aid of an emulsifying agent. This method of forming polyethylene emulsions is undesirable because of the numerous economically unfeasible operations required, and further because even the low solids content emulsions attainable are relatively unstable.

Polyethylene emulsions have been formed directly by polymerizing ethylene in aqueous medium in the presence of water-soluble free radical generating catalysts and various emulsifying agents. Polyethylene emulsions prepared by any of these well known methods exhibit deficiencies in three main areas. The primary deficiency is that the emulsions obtained have a relatively low solids content, the polymer content of the emulsions ordinarily being no greater than 25% by weight and in most instances less than 15% by weight. While products having this relatively low polymer content find practical utility at these concentrations, it is highly desirable to have emulsion products in which the polymer content is significantly greater than that of the typical emulsions prepared by the prior art processes.

Secondly the polyethylene emulsions obtained by known processes are relatively unstable even with the low solids content and are of little value unless used in a relatively short time. Attempts have been made to counteract this deficiency by adding additional emulsifying agents at given intervals during storage and by agitating the emulsions before shipment and use. However none of these methods is satisfactory and in addition they are uneconomical. Finally the known polyethylene emulsions are nonuniform in particle size of polymer. This is disadvantageous in many coating applications particularly where uniform, continuous coatings are required.

It has now been discovered that stable, high solids content polyethylene emulsions containing relatively spherical particles having uniform particle size can be prepared by the process which comprises initiating the polymerization of ethylene in aqueous medium in the presence of water-soluble free radical polymerization catalyst and specific anionic/nonionic emulsifying agent systems and thereafter adding an aqueous anionic/nonionic emulsifying agent mixture to the polymerization medium over the duration of the polymerization reaction at a rate such that the product polyethylene emulsion contains at least 5 weight percent of anionic/nonionic emulsifying agent composition based on the polyethylene.

In the preferred embodiment of this invention a "monodisperse emulsion" is produced. The term "monodisperse emulsion" as used in the specification and appended claims means a stable polyethylene emulsion of high solids content containing relatively spherical particles of polyethylene having a diameter from about 1200 A. to 2500 A. wherein at least about 90% of the relatively spherical polyethylene particles are within a given particle size range of about ±100 A.

The process of this invention is a critical process and a number of necessary features must be observed. The emulsifier system is critical with respect to emulsifying agents employed, relative amounts of each and emulsifying agent concentration both in the initial polymerization reaction medium and during the polymerization reaction. The emulsifier system useful in this invention is a mixture of anionic and nonionic emulsifying agents. The anionic/nonionic emulsifying agent composition contains from about 2% to 50% by weight of anionic emulsifying agent, based on the total anionic/nonionic emulsifying agent composition, and preferably from about 5% to 25% of anionic emulsifying agent on the indicated basis. It is critical that the initial concentration of emulsifying agent composition in the polymerization reaction medium be kept below about 3.5 weight percent, based on the water. Emulsifier concentrations greater than this result in unstable, low solids content emulsions. Initial emulsifying agent composition concentrations from about 0.1% to 3.5% by weight, based on the water, have been found operable in this invention. Emulsifier concentrations less than 0.1% result in coagulation.

It is also critical that additional anionic/nonionic emulsifying agent composition be added to the polymerization medium over the duration of the polymerization reaction. The additional emulsifying agent composition is required for the new particles formed during polymerization and is usually added in the form of an aqueous mixture. The anionic/nonionic emulsifying agent composition in the aqueous mixture added during polymerization also contains from about 2% to 50% by weight of anionic emulsifying agent, based on the total anionic/nonionic emulsifying agent composition, and preferably from about 5% to 25% on the indicated basis. The addition of the emulsifying agent composition during polymerization can be carried out either continuously or intermittently. The rate of addition of the emulsifying agent composition during polymerization must be sufficient to furnish the required amount of emulsifying agent composition for the newly formed particles. An addition rate somewhat in excess of reaction rate is not deleterious to the polyethylene emulsions but addition rates either insufficient to furnish the required quantity of emulsifying agent composition for the newly formed particles or greatly in excess of reaction rate will cause coagulation.

The amount of anionic/nonionic emulsifying agent composition in the aqueous emulsifier mixture added over the duration of the polymerization reaction is generally from about 10% to 90%. However, since polymerization rate can be affected by different catalysts, amounts of catalyst, temperatures and pressures, the exact amount will vary with differing sets of conditions.

The amount of emulsifier present in the product polyethylene emulsion should be at least 5% and preferably 10% based on the weight of the total polymer. Amounts from 10% to 15% are preferred. Amounts greater than 15% can be tolerated but they are not required and they do not add to the desired properties of the emulsions.

The emulsifying agents employed in this invention are the anionic and nonionic emulsifying agents as mentioned hereinbefore. The most convenient method of designation of emulsifying agents which are suitable to prepare polyethylene emulsions according to the present invention is the "HLB" method of designation. The letters "HLB" stand for hydrophile-lipophile-balance. According to this method of designation, an HLB number is assigned to each emulsifying agent, and is related by a scale to the suitable applications. Any anionic emulsifying agent having HLB number values of at least 10 and any nonionic emulsifying agent having HLB number values of at least 5 can be used in the practice of this invention. The methods of determining HLB numbers are set forth in the literature in great detail (W. C. Griffin, J. Soc. Cosmetic Chemists, 1,311 (1949); W. C. Griffin, J. Soc. Cosmetic Chemists, 5,249 (1954); and P. Becher, "Emulsions: Theory and Practice," Amer. Chem. Soc. Monograph Series, 1957, pp. 189 et seq.). A relatively simple method for estimating the HLB range may be obtained from the water solubility of the emulsifying agent. See W. T. Griffin, Offic. Dig. Federation Paint and Varnish Production Clubs, vol. 28, 466 (1956).

The anionic emulsifying agents useful in this invention are well known in the art and include by way of example and not limitation the water soluble salts of fatty alcohol half esters of sulfuric acid, e.g. the alkali metal alkyl or alkylene sulfates or sulfonates such as sodium and potassium lauryl sulfates and stearyl sulfonates and the ammonium or ethanolamine salts thereof and other such ester salts where the fatty alcohol contains from 8 to 24 carbon atoms; the alkali metal soaps of disproportionated rosin acids, e.g. the potassium soap; the alkali soaps of coconut fatty acids, e.g. the potassium soap; ammonium casein solution; soaps such as sodium and/or potassium myristate, laurate, oleate and stearate; water soluble alkali metal and ammonium salts of sulfonated long chain mono and dialkyl substituted aryl hydrocarbons of the formula $RSO_3M$ wherein M is a cation of an alkali metal such as lithium, sodium or potassium, or an ammonium or alkylammonium cation; and R represents an alkaryl radical of about 10 to 30 carbon atoms, such as the butylphenyl, decylphenyl, dodecylphenyl, tridecylphenyl and butylbiphenyl radical, e.g. decylbenzene sodium sulfonate, diisobutyl naphthalene sodium sulfonate, dodecylbenzene sodium sulfonate, dibutyl ammonium dodecylbenzenesulfonate and diisopropylammonium tridecylbenzenesulfonate; and the salts of bis(alkyl)sulfosuccinic acids which correspond to the formula

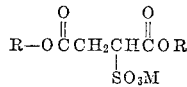

wherein each R, which may be the same or different, is an alkyl group containing 7 to 20 carbon atoms such as heptyl, octyl, nonyl, decyl, undecyl, dodecyl, tridecyl, tetradecyl, pentadecyl or hexadecyl; and M is a cation of an alkali metal such as lithium, sodium or potassium, or an ammonium or alkylammonium cation.

Among commercially available anionic emulsifying agents which can be used in this invention there may be mentioned the monoalkyl aryl sulfonates wherein the alkyl group contains from 8 to 20 carbon atoms, e.g. "Ultrawet DS" (decylbenzene sodium sulfonate); "Santomerse ME" (92% active sodium dodecyl benzene sulfonate); "Aerosoletine" (N-octadecyl sulfosuccinimate); "Aerosol OT" (sodium dioctylsulfosuccinate) and "Duponol C" (sodium lauryl sulfate).

The nonionic emulsifying agents which may be used in accordance with this invention are well known in the art and include by way of example and not limitation ethylene oxide-propylene oxide block copolymers containing at least 10 wt. percent ethylene oxide and having a molecular weight of at least 1750; alkylphenoxypolyethenoxyethanols where the alkyl substituent contains from 7 to 12 carbon atoms, e.g. octyl and nonyl, and the polyethenoxyethanol group corresponds preferably to an adduct of 2 to 50 mols of ethylene oxide; and polyoxyethylene derivatives of e.g. alcohols, acid, ethers, phenols, amides or amines, a large number of which are commercially available. The polyoxyethylene derivatives generally satisfy one of the following formulas:

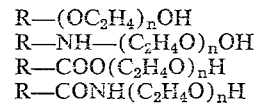

wherein R is selected from the group consisting of hydrocarbon radicals of 10 to 20 carbon atoms and aryl or alkaryl hydrocarbon radicals of 10 to 30 carbon atoms, and $n$ is an integer of 2 to 30.

Among commercially available nonionic emulsifying agents which can be used in accordance with the present invention there may be mentioned the product "Alphenyl" which corresponds to the first of the aforementioned formulas $R—(OC_2H_4)_nOH$ in which R is the butylphenylene radical and $n$ is 8, said product resulting from the condensation of about 8 mols of ethylene oxide with one mol of butyl phenol and the "Polyrad" products which correspond to the second of said formulas wherein R—NH is the residue of rosin amine (dehydroabiethylamine) $R—NH_2$. In "Polyrad 1100," e.g. the integer $n$ is equal to 11, "Emulphor A" and "Ethofat 6060" are trade names of products which correspond to the third formula, R—COO—being the residue of oleic acid in the former and stearic acid in the latter. Finally "Brij 30" and "Brij 35" are trade names of products corresponding to the first formula in which R is the residue of lauryl alcohol and $n$ is 4 and 24, respectively.

Numerous other commercially available nonionic emulsifying agents such as "Sterox NL" (nonylphenol-ethylene oxide adduct containing 12 mols of ethylene oxide), "Tween 40" (polyoxyethylene sorbitan monopalmitate), "Triton X–100" (isooctylphenoxypolyethoxy ethanol), "Tween 80" (polyoxyethylene sorbitan monooleate) and "Pluronic L–61" (ethylene oxide-propylene oxide block copolymer containing 10 weight percent ethylene oxide and having molecular weight of 1750) also can be used in the present invention.

In the preferred embodiment of this invention wherein the relatively spherical particles of polyethylene are uniform in size, the relationship between the normality of the aqueous polymerization medium based on the inorganic electrolyte salt and the amount of anionic/nonionic emulsifying agent composition present in the initial polymerization medium is critical. The preferred emulsions of this invention, i.e. monodisperse emulsions, have a narrow particle size distribution and are prepared by controlling normality and emulsifier concentration in the initial polymerization medium according to the formula $Y=KX^{\frac{1}{2}}$ wherein X is the concentration of nonionic/anionic emulsifying agent composition in the initial polymerization medium, weight percent based on the water, Y is the normality of the initial polymerization medium based on the inorganic electrolyte salt present in the initial polymerization medium, and K is a number from about 0.100 to 0.125. The uniform particle size latices prepared by the above formula contain particles within the range of 1200 A. to 2500 A. and have at least 90% of the particles within a given particle size range of about ±100 A.

Any of the well known inorganic electrolyte salts of weak acids and strong bases can be employed as the basis for normality in the process of this invention. The preferred inorganic electrolyte salts are the alkali metal and alkaline earth metal halides, sulfates, persulfates, nitrates, carbonates, chlorates and perchlorates. It will be understood that many of the water-soluble free radical ethylene polymerization catalysts which are discussed hereinafter can serve the dual function of catalyst and basis for the required normality at the same time. It will also be understood that many of the electrolyte buffers which are discussed hereinafter can serve the dual function of buffer and basis for the required normality at the same time. Thus in many instances it will be necessary to use only an inorganic electrolyte salt which is also an ethylene polymerization catalyst together with the usual buffer system for pH control in the preferred embodiment of this invention.

The polyethylene emulsions prepared by the process of this invention are characterized by stability, high solids content and relatively spherical particles of substantially uniform diameter. The emulsions prepared in accordance with the preferred embodiment of this invention are particularly characterized by particles of uniform diameter. The significant advantages of the high solids content aqueous polyethylene emulsions of this invention are (1) The elimination of an additional operation, i.e. evaporation required to increase the solids content of known emulsions;

(2) Transporting less water and more polymer per unit of aqueous emulsion shipped;

(3) The application of greater solids content per coat with the accompanying lesser amount of water to be removed by volatilization in drying the coating; and (4) More uniform, continuous coatings without imperfections caused by the volatilization of copious amounts of water.

The polyethylene emulsions of the present invention in contradistinction to prior art emulsions exhibit good stability even over prolonged storage, e.g. greater than 3 years. Improved stability is of course an economic advantage and in addition one that will broaden the use of the present emulsions in known areas and possibly effectuate their use in new areas.

The polyethylene particles of the emulsions of this invention are relatively spherical and of uniform diameter, particularly the "monodisperse emulsions." Such emulsions are of great importance in critical coating applications where uniform, continuous coatings are required.

If desired the polyethylene can be easily precipitated from the emulsion produced by adding large amounts of metal salts such as aluminum sulfate or calcium chloride or by other well known techniques. The particulate polyethylene is then recovered in the usual manner, e.g. by filtration. This particulate polyethylene is particularly suitable for special coating processes where a fine grain size is important such as in flame coating or coating by fluid bed techniques.

In carrying out the process of this invention the initial polymerization recipe generally contains from about 100 to 200 parts of ethylene for each 100 parts of water depending upon the final total solids content desired in the emulsion. Preferably about 140 to 160 parts of ethylene are present for each 100 parts of water in order to obtain high solids content emulsions. The degree of polymerization may be varied as desired but ordinarily is from about 60% to 85% conversion of ethylene to polymer. The reaction is carried out in aqueous medium at a pH in the range of 5–12 with a pH in the alkaline range of 8–10 being particularly preferred. Ordinarily, the pH is established by selection of an electrolyte which acts as a buffer to maintain the desired pH value.

It is generally accepted in emulsion polymerization technology that agitation is required to form the dispersion initially and to maintain the dispersion throughout polymerization. The rate of agitation to be used in any particular instance will be dependent primarily on the overall design of the polymerization equipment. The minimum amount of agitation required to form and to maintain the dispersion is usually to be desired.

While aqueous emulsion polymerization can be conducted at temperatures ranging from a temperature just above the freezing temperature up to the reflux temperature of the aqueous reaction mixture, more practical operating temperatures are in the range of about 50° C. to about 85° C., a range of about 60° C. to 80° C. being particularly preferred.

Polymerization in accordance with this invention can be carried out at pressures from about 3000 to 35,000 p.s.i., a range of 5000 to 15,000 p.s.i. being particularly preferred.

Any of the compounds known to generate free radicals and which are soluble at effective concentrations in the aqueous polymerization medium may be used as the polymerization catalyst in practicing this invention. Examples of useful polymerization catalysts include the alkali metal and ammonium persulfates, perborates, or percarbonates, hydrogen peroxide, organic peroxides such as benzoyl peroxide, cumene hydroperoxide, tertiary butyl peroxide, tertiary butyl perbenzoate, and Tetralin peroxide. Ammonium, potassium and sodium persulfates are particularly preferred. Organic peroxides may be used in combination with these inorganic peroxidic catalysts. Azonitrile compounds such as described in U.S. Patent 2,471,959 can be used also as a polymerization catalyst for polyethylene in this invention.

Generally, the proportion of polymerization catalyst is in the range of 0.02% to 3.0% based on the weight of the ethylene monomer, preferably from 0.05% to 1%, with a range of 0.1% to 0.5% on the indicated basis being especially preferred.

The catalyst can also be a peroxidic catalyst activated with a reducing agent to provide a redox system. Examples of useful reducing agents include water-soluble bisulfites, such as sodium metabisulfite, sulfites, hydrosulfites, and thiosulfates. The redox system may be further activated by the presence of polyvalent metal ions, e.g., ferrous ions at concentrations of the order of magnitude of several parts per million, or with tertiary amines which are soluble in the reaction mixture.

The proportion of reducing agent included in the polymerization catalyst combination ordinarily ranges up to 3% based on the weight of the monomers and preferably is in the range of 0.02% to 1% on this basis. In the inorganic redox system of persulfate and bisulfite, the weight ratio can vary from 1 to 10 parts of persulfate per part by weight of bisulfite.

Additives such as dyes, pigments, fillers, thermal antioxidants, carbon black, stabilizers etc. can be incorporated into the polymerization medium if they do not interfere with polymerization. Such additives can be added to the product emulsions since they do not result in breaking the emulsion. Film-formers and viscosifiers such as methyl cellulose, ethyl cellulose, hydroxyethyl cellulose, ethyl hydroxyethyl cellulose, carboxymethyl cellulose and the like as well as polyethylene glycols etc. can be added if desired to assure the formation of uniform, continuous film.

The following examples will serve to illustrate the invention. Parts and percent are by weight unless otherwise indicated.

Example 1

The following recipe is employed in making a stable, high solids content, relative uniform particle size polyethylene emulsion.

| Initial reaction medium: | Parts |
|---|---|
| Water | 280 |
| Catalyst, $K_2S_2O_8$ | 0.1 |
| $Na_2CO_3$ | 0.1 |
| Pluronic L-61 | 0.45 |
| Duponol C | 0.05 |
| Ethylene | 407 |

Added during polymerization: Parts
    Water _____ 229
    Pluronic L-61 _____ 36
    Duponol C _____ 4

A polymerization reaction vessel equipped with means for agitation and temperature control is prepared for charging by purging with ethylene. The reaction vessel is then evacuated and an aqueous solution having pH 10 and containing the above amounts of water, anionic/nonionic emulsifying agent composition, inorganic electrolyte salt as buffer, and catalyst is charged to the vessel. Ethylene is then introduced into the reaction vessel while heating the contents to 70° C. until a pressure of 10,000 p.s.i. is reached. The temperature is held at about 70° C. during the polymerization reaction. Polymerization begins within about 10 to 30 minutes and the above aqueous nonionic/anionic emulsifier composition is introduced into the vessel over the duration of the polymerization period. After about 10 hours the reactor is cooled to about 25° C., the vessel is vented and the emulsion recovered. The product is a fluid emulsion of polyethylene having a polymer solids content of 36.15%, an average particle size of 2000 A., and stability for periods greater than two years.

Example 2

Following the procedure of Example 1 and using the recipe:

Initial reaction medium:
    Water _____ 250
    Catalyst $K_2S_2O_8$ _____ 1.0
    $Na_2CO_3$ _____ 1.0
    Sterox NL _____ 0.9
    Santomerse ME _____ 0.1
    Ethylene _____ 410

Added during polymerization:
    Water _____ 238
    Sterox NL _____ 33.3
    Santomerse ME _____ 3.7

A fluid emulsion of polyethylene having the following properties is obtained after a 6 hour reaction period Polymer solids content _____ 38%.
Average particle size _____ 1950 A.
Stability _____ Greater than 2 years.

Examples 3 and 4

Equally good results are obtained by following the procedure of Example 1 and using the following emulsifier compositions in place of the emulsifiers of Example 1. Results and further details are given in Table 1 below.

Example 3

Initial reaction mixture: Parts
    "Brij 35" _____ 0.8
    "Aerosol OT" _____ 0.2

Example 4

Initial reaction mixture:
    "Triton X-100" _____ 0.6
    "Ultrawet DS" _____ 0.4

Example 3

Added during reaction:
    "Brij 35" _____ 30
    "Aerosol OT" _____ 10

Example 4

Added during reaction:
    "Triton X-100" _____ 25
    "Ultrawet DS" _____ 15

Example 5

Using the procedure of Example 1 the following seven runs are made. Results and further details are given in Table 1 below.

TABLE 1

|  | 1 | 2 | 3 | 4 | 5 | 6 | 7 |
|---|---|---|---|---|---|---|---|
| Initial Polymerization Medium, Parts: | | | | | | | |
| Water | 250 | 250 | 250 | 250 | 250 | 250 | 250 |
| Catalyst, $K_2S_2O_8$ | 0.4 | 0.5 | 0.5 | 1.0 | 1.0 | 2.0 | 1.0 |
| Salt, $Na_2CO_3$ | 0.3 | 0.5 | 0.5 | 1.7 | 1.0 | 2.0 | 2.4 |
| Pluronic L-61 | | | | 3.6 | | | |
| Duponol C | | | | 0.4 | | | |
| Sterox NL | 0.225 | 0.45 | 0.45 | | 1.8 | 7.2 | 7.2 |
| Santomerse ME | .025 | 0.05 | 0.05 | | 0.2 | 0.8 | 0.8 |
| Ethylene | 410 | 420 | 410 | 412 | 410 | 415 | 415 |
| Normality [1] | 0.035 | 0.052 | 0.052 | 0.158 | 0.104 | 0.210 | 0.208 |
| Emulsifier Conc.[2] | .1 | 0.2 | 0.2 | 1.6 | 0.8 | 3.2 | 3.2 |
| Added During Reaction, Parts: | | | | | | | |
| Water | 221 | 219 | 307 | 237 | 237 | 212 | 204 |
| Pluronic L-61 | | | | 34.2 | | | |
| Duponol C | | | | 3.8 | | | |
| Sterox NL | 35.1 | 35.1 | 48.6 | | 34.2 | 33.8 | 32.4 |
| Santomerse ME | 3.9 | 3.9 | 5.4 | | 3.8 | 3.8 | 3.6 |
| Polymerization Conditions: | | | | | | | |
| Temp., °C | 70 | 70 | 70 | 70 | 70 | 70 | 70 |
| Pressure, p.s.i. | 10,000 | 10,000 | 10,000 | 10,000 | 10,000 | 10,000 | 10,000 |
| Time, hrs | 8.5 | 7 | 21 | 6 | 7 | 4 | 7 |
| Product: | | | | | | | |
| Percent Solids | 37.5 | 38.2 | 40.8 | 37.5 | 35.9 | 39 | 38 |
| Average Particle Size, A | 2,200 | 1,800 | 2,010 | 1,830 | 1,880 | 2,200 | 2,250 |
| Particle Size Range,[3] A | ±100 | ±100 | ±100 | ±100 | ±100 | ±100 | ±100 |
| Stability | (4) | (4) | (4) | (4) | (4) | (4) | (4) |

[1] Based on inorganic electrolyte salt.
[2] Weight percent based on initial water.
[3] Determined by electron micrograph.
[4] Greater than two years.

As is apparent from Runs 1 to 7 of Example 5, stable polyethylene emulsions having a narrow particle size distribution as determined by electron micrograph are produced when the relationship between normality of the aqueous reaction medium and concentration of emulsifier composition in the initial reaction medium is controlled by the formula $Y=KX^{\frac{1}{2}}$ wherein Y, K and X have the same meanings as given hereinbefore. As is also apparent from Runs 1 to 7 of Example 5, an ethylene polymerization catalyst which is also an inorganic electrolyte salt can be used together with a non-catalytic salt. When an ethylene polymerization catalyst which is not an inorganic polyelectrolyte salt is used, such as an organic peroxide, the required amount of inorganic electrolyte salt, either catalytic or non-catalytic or combinations thereof, must be present if narrow particle size distribution is desired.

The preparation of a polymer emulsion involves many variables which to a large extent are interdependent. In this regard this invention contemplates the use of the prior known polyethylene emulsion polymerization technology, including known procedures, techniques and compositions. Exemplary of such prior technology, it is known that polyethylene latices may be prepared by continuous, semi-continuous or batchwise emulsion polymerization techniques. In typical batchwise polymerization the ethylene is dispersed in an aqueous phase containing a free-radical polymerization catalyst and an emulsifying agent for the polymer in the water. The polymerization is initiated and maintained under agitation at an elevated temperature until polymerization is substantially complete.

Useful continuous polymerization systems include, in effect, a modified batchwise procedure in which the monomer is added continuously or in increments to the polymerization medium as polymerization proceeds, or the monomer together with one or more other ingredients such as emulsifying agent, protective colloid or catalyst, are so added. Continuous polymerization also includes continuous procedures involving either a series of interconnected zones, such as polymerization kettles or continuous coils, tubular reactors or the like. The present invention finds utility and operability in all of these known procedures and techniques.

Example 6 below illustrates one process for the continuous production of polyethylene emulsion in accordance with this invention.

Example 6

The following recipe is employed in making a stable, high solids content, relative uniform particle size polyethylene emulsion by continuous process.

| Initial reaction medium: | Parts |
|---|---|
| Water | 835 |
| Catalyst, $K_2S_2O_8$ | 3.38 |
| $Na_2CO_3$ | 1.04 |
| Pluronic L–61 | 1.52 |
| Duponol C | 0.16 |
| Ethylene | 1375 |
| Added during polymerization: | |
| Water | 800 |
| Pluronic L–61 | 95.3 |
| Duponol C | 10.5 |

A polymerization reaction vessel equipped with means for agitation, temperature control and product removal is prepared for changing by purging with ethylene. The reaction vessel is then evacuated and an aqueous solution having pH 8 and containing the above amounts of water, anionic/nonionic emulsifying agent composition, sodium carbonate as buffer, and catalyst is charged to the vessel. Ethylene is then introduced into the reaction vessel while heating the contents to 82.5° C. until a pressure of 10,000 p.s.i. is reached. The temperature is held at about 82.5° C. during the polymerization reaction. Polymerization begins within about 10 to 30 minutes and the pressure is held substantially constant by introducing the above aqueous nonionic/anionic emulsifying agent composition to the vessel over the duration of the polymerization period. After about 6 hours the addition of the emulsifying agent composition is stopped and the following materials are fed to the reaction vessel over a 24 hour reaction period.

| Continuous operation: | Parts/hr. |
|---|---|
| Water | 623 |
| Pluronic L–61 | 49.5 |
| Duponol C | 5.5 |
| Ethylene | 710 |
| Catalyst $K_2S_2O_8$ | 1.6 |
| $Na_2CO_3$ | 0.8 |

Polyethylene emulsion is recovered from the reaction vessel at an average rate of 994 parts per hour for 24 hours. The product is a fluid polyethylene emulsion having the following properties:

| | |
|---|---|
| Polymer solids content | 33%. |
| Average particle size | 2050 A. |
| Particle size range | 1950 A. to 2330 A. |
| Stability | Greater than 1 year. |

What is claimed is:
1. Process for the preparation of stable, high solids content polyethylene emulsions containing relatively spherical particles having a diameter from about 1200 A. to 2500 A. wherein at least 90% of said particles are within a given particle size range of 200 A. which comprises initiating the polymerization of ethylene in aqueous medium at pH 5 to 12, said ethylene being present in the amount of 1 to 2 parts per part of water, in the presence of a water-soluble polymerization catalyst and from about 0.1% to 3.5%, based on the water in the initial polymerization medium, of an anionic/nonionic emulsifying agent composition containing 2%–50% of an anionic emulsifying agent and 50% to 98% of a nonionic emulsifying agent, said percentages being based on the total emulsifying agent composition, and during the polymerization period introducing at least incrementally additional amounts of an aqueous mixture of said anionic/nonionic emulsifying agent composition containing 10% to 90% emulsifying agent at a rate such that the product emulsion contains at least 5 wt. percent anionic/nonionic emulsifying agent composition based on the polyethylene and less than the amount of emulsifying agent composition required to coagulate the then formed polyethylene, said initial aqueous polymerization medium having a normality based on inorganic electrolyte salt present calculated from the formula $Y=KX^{1/2}$ wherein X is the weight percent concentration of said anionic/nonionic emulsifying agent composition in the initial polymerization medium, K is a number from 0.100 to 0.125 and Y is the normality of the aqueous medium on the above indicated basis.

2. The process of claim 1 wherein said anionic/nonionic emulsifier composition contains from 5% to 25% of an anionic emulsifying agent and from 75% to 95% of a nonionic emulsifying agent, said percentages being based on the total emulsifying agent composition.

3. The process of claim 1 wherein the anionic emulsifying agent is represented by the formula $RSO_3M$ wherein M is an alkali metal cation and R represents an alkaryl radical of about 10–30 carbon atoms; and wherein the nonionic emulsifying agent is represented by the formula $R—(OC_2H_4)_nOH$ where R is selected from the group consisting of aliphatic hydrocarbon radicals of 10 to 20 carbon atoms, aryl hydrocarbon radicals of 10 to 30 carbon atoms and alkaryl hydrocarbon radicals of 10 to 30 carbon atoms and $n$ is an integer of 2 to 30.

4. The process of claim 1 wherein the anionic emulsifying agent is sodium dodecylbenzene sulfonate and the nonionic emulsifying agent is a nonyl phenol-ethylene oxide condensation product containing 12 mols of ethylene oxide.

5. The process of claim 1 wherein the anionic emulsifying agent is sodium lauryl sulfate and the nonionic emulsifying agent is an ethylene oxide-propylene oxide block copolymer containing 10 weight percent ethylene oxide and having a molecular weight of 1750.

References Cited

UNITED STATES PATENTS

| 2,462,390 | 2/1949 | Harmon | 260—29.6 |
| 2,592,526 | 4/1952 | Seed | 260—29.6 |
| 2,995,533 | 8/1961 | Parmer et al. | 260—29.6 |
| 3,247,141 | 4/1966 | Stryker et al. | 260—29.6 |
| 3,296,170 | 1/1967 | Burkhart et al. | 260—29.6 |

MURRAY TILLMAN, Primary Examiner.

J. L. WHITE, Assistant Examiner.